United States Patent [19]

Plachetta et al.

[11] Patent Number: 4,877,823

[45] Date of Patent: Oct. 31, 1989

[54] FIREPROOFED THERMOPLASTIC MOLDING MATERIALS CONTAINING RED PHOSPHORUS AND BASED ON POLYESTERS OR POLYAMIDES

[75] Inventors: Christoph Plachetta, Limburgerhof; Graham E. McKee, Weinheim; Hans-Peter Weiss, Mutterstadt, all of Fed. Rep. of Germany

[73] Assignee: BASF Aktiengesellschaft, Ludwigshafen, Fed. Rep. of Germany

[21] Appl. No.: 183,095

[22] Filed: Apr. 19, 1988

[30] Foreign Application Priority Data

Apr. 24, 1987 [DE]  Fed. Rep. of Germany ....... 3713746

[51] Int. Cl.$^4$ .............................................. C08K 3/32
[52] U.S. Cl. ...................................... 524/80; 524/160; 524/414; 524/504; 524/507; 524/513; 524/706
[58] Field of Search ................. 524/160, 80, 414, 504, 524/507, 513, 706

[56] References Cited

U.S. PATENT DOCUMENTS

| | | | |
|---|---|---|---|
| T103,701 | 12/1983 | Tuller et al. | 524/293 |
| 3,048,567 | 8/1962 | Kohlwey | 524/414 |
| 3,778,407 | 12/1973 | Hild et al. | 524/414 |
| 3,882,076 | 5/1975 | Largman et al. | 524/414 |
| 4,105,735 | 8/1978 | Dany et al. | 264/143 |
| 4,185,044 | 1/1980 | Tacke et al. | 524/414 |
| 4,208,317 | 6/1980 | Cerny et al. | 523/205 |
| 4,403,052 | 9/1983 | Largman et al. | 524/414 |
| 4,707,513 | 11/1987 | Baer | 524/504 |

FOREIGN PATENT DOCUMENTS 0125483 11/1984 European Pat. Off. .
3215750 11/1983 Fed. Rep. of Germany .
1458194 12/1976 United Kingdom .

*Primary Examiner*—John Kight
*Assistant Examiner*—Kriellion Morgan
*Attorney, Agent, or Firm*—Oblon, Spivak, McClelland, Maier & Neustadt

[57] ABSTRACT

Fireproofed thermoplastic molding materials which contain red phosphorus as a flame-proofing agent are obtainable by mixing (A) from 5 to 95% by weight of a polyamide or of a polyester or of a mixture of these, (B) from 5 to 95% by weight of an elastomer dispersion containing, as essential components, (b$_1$) from 5 to 75% by weight of an elastomer prepared by emulsion polymerization, (b$_2$) from 10 to 70% by weight of red phosphorus, p2 (b$_3$) from 10 to 80% by weight of water and (b$_4$) from 0.1 to 5% by weight of dispersant, and (C) from 0 to 60% by weight of fibrous or particulate fillers or a mixture of these, the total content of red phosphorus in the molding material being from 3 to 20% by weight, based on the total weight of the molding material, and the elastomer composition being introduced into a melt of the polyamide or of the polyester or of a mixture of these.

14 Claims, No Drawings

FIREPROOFED THERMOPLASTIC MOLDING MATERIALS CONTAINING RED PHOSPHORUS AND BASED ON POLYESTERS OR POLYAMIDES

The present invention relates to fireproofed thermoplastic molding materials which contain red phosphorus as a flameproofing agent and are obtainable by mixing (A) from 5 to 95% by weight of a polyamide or of a polyester or of a mixture of these, (B) from 5 to 95% by weight of an elastomer dispersion containing, an essential components, (b$_1$) from 5 to 75% by weight of an elastomer prepared by emulsion polymerization, (b$_2$) from 10 to 70% by weight of red phosphorus, (b$_3$) from 10 to 80% by weight of water and (b$_4$) from 0.1 to 5% by weight of a dispersant, and (C) from 0 to 60% by weight of fibrous or particulate fillers or a mixture of these, the total content of red phosphorus in the molding material being from 3 to 20% by weight, based on the total weight of the molding material, and the elastomer composition being introduced into a melt of the polyamide or of the polyester or of a mixture of these.

The present invention furthermore relates to a process for the preparation of such molding materials, and their use for the production of moldings, and to moldings obtainable from the novel molding materials.

Use of red phosphorus as the flameproofing agent in polyamides and polyesters has long been known. However, incorporation of red phosphorus in powder form into the polymer melt has some serious disadvantages.

Since the phosphorus comes into contact with very hot surfaces during this procedure, there is a danger of phosphorus fires and phosphorus dust explosions. Moreover, phosphorus dusts are considered a health hazard.

To improve the incorporation, in particular to reduce the dust, it has been proposed to coat or surround the red phosphorus with a polymer. For this purpose, GB-A-1 458 194 proposes styrene/butadiene copolymers and DE-A-26 25 691 proposes polymers having a softening point about 90° C. Furthermore, DE-A-32 15 750 describes a process for fireproofing polyamides and polyurethanes, in which the red phosphorus is used in a low molecular weight polyamide as the carrier.

Although all these measures improve the dust problem, they cannot adequately overcome the danger of phosphorus fires and phosphorus dust explosions.

It is an object of the present invention to provide fireproofed thermoplastic molding materials treated with red phosphorus and based on polyesters and polyamides, the said molding materials being capable of being prepared in a safe manner without health hazards and moreover having excellent mechanical properties.

We have found that this object is achieved, according to the invention, by the fireproofed thermoplastic molding materials defined at the outset.

The novel molding materials are obtainable by mixing from 5 to 95% by weight of a polyamide or of a polyester, or of a mixture of these, from 5 to 95% by weight of an elastomer composition which contains, as essential components, an elastomer (component b$_1$) prepared by emulsion polymerization, red phosphorus (b$_2$), water (b$_3$) and a dispersant (b$_4$).

The polyamides used as component (A) are known per se. Partially crystalline or amorphous polyamides having a weight average molecular weight of not less than 5,000, as described in, for example, German Laid-Open applications DOS 2,071,250, DOS 2,071,251, DOS 2,130,523, DOS 2,130,948, DOS 2,241,322, DOS 2,312,966, DOS 2,512,606 and DOS 3,393,210, are preferred.

Examples of these are polyamides which are derived from lactams having 7 to 13 ring members, such as polycaprolactam, polycapryllactam and polylaurolactam, and polyamides which are obtained by reacting dicarboxylic acids with diamines. Suitable dicarboxylic acids are alkanedicarboxylic acids of 4 to ;b 12, in particular 6 to 10, carbon atoms and aromatic dicarboxylic acids. Adipic acid, azelaic acid, sebacic acid, dodecanedioic acid, terephthalic acid and isophthalic acid may be mentioned here merely as examples.

Particularly suitable diamines are alkanediamines of 4 to 14, in particular 4 to 10, carbon atoms and m-xylylenediamine, di-(4-aminophenyl)-methane, di-(4-aminocyclohexyl)-methane, 2,2-di-(4-aminophenyl)-propane and 2,2-di-(4-aminocyclohexyl)-propane. Polyamides which are obtainable by copolymerization of two or more of the abovementioned monomers, or mixtures of a plurality of polyamides, are also suitable.

Processes for the preparation of such polyamides, as well as such polyamides themselves, are known per se and are described in the literature, so that no further information is required here.

The relative viscosity of the polyamides is in general from 2.2 to 4.5, measured in 96% strength by weight sulfuric acid (1 g/100 ml) at 25° C.).

The polyesters which can be used as component (A) are also known per se and are described in the literature. Preferably used polyesters are those which contain an aromatic ring in the main chain. This may also be substituted, for example by halogens, such as chlorine or bromine, and by C$_1$–C$_4$-alkyl, eg. methyl, ethyl, isopropyl, n-propyl, isobutyl, n-butyl or tert-butyl.

The polyesters can be prepared by reacting dicarboxylic acids, their esters or other ester-forming derivatives with dihydroxy compounds in a conventional manner.

Examples of suitable dicarboxylic acids are aliphatic and aromatic dicarboxylic acids, which may also be used in the form of a mixture. Naphthalenedicarboxylic acids, terephthalic acid, isophthalic acid, adipic acid, azelaic acid, sebacic acid, dodecanedioic acid and cyclohexanedicarboxylic acids as well as mixtures of these carboxylic acids and their ester-forming derivatives may be mentioned here merely by way of example.

Preferably used dihydroxy compounds are diols of 2 to 6 carbon atoms, particularly preferably ethylene glycol, butane-1,4-dio, butene-1,4-diol and hexane-1,6-diol; however, it is also possible to use hexane-1,4-diol, cyclohexane-1,4-diol, 1,4-di-(hydroxymethyl)-cyclohexane, bisphenol A, neopentylglycol, mixtures of these diols and ester-forming derivatives of these diols.

Polyesters of terephthalic acid and a C$_2$–C$_6$-diol component, such as polyethylene terephthalate and polybutylene terephthalate, are particularly preferred.

The relative viscosity, $\eta$ spec/c, of such polyesters, measured on a 0.5% strength by weight solution in a phenol/ortho-dichlorobenzene mixture (weight ratio 3:2) at 25° C., is in general from 1.2 to 1.8 dl/g.

For the purposes of the present invention, polyesters include polycarbonates which are obtainable by polymerization of aromatic dihydroxy compounds with carbonic acid, or their derivatives. Products of this type are known per se and are described in the literature.

Other polyesters are the liquid crystalline polyesters which exhibit pronounced anistropy of certain properties. The thermotropic wholly aromatic polyesters, as are known to the skilled worker from a large number of patent applications, may be mentioned here in particular. These form an anisotropic molten phase.

In principle, polyamides, or polyesters alone or any mixtures of these may be used as component (A). The amount of component (A) in the novel molding materials is from 10 to 90, preferably from 20 to 80, in particular from 30 to 75, % weight, based on the total weight of the molding material.

The aqueous elastomer compositions (B) which, when mixed with a melt of the component (A), give the novel molding materials contain, as essential components, the components (b₁) to (b₄) stated in claim 1.

Component (b₁) is an elastomer which is prepared by emulsion polymerization and accounts for from 5 to 75, preferably from 15 to 65, and in particular from 20 to 60, % by weight of the elastomer composition.

The elastomers can be prepared by emulsion polymerization in a conventional manner, as described in, for example, Houben-Weyl, Methoden der organischen Chemie, volume XII. I (1961), and by Blackley in the monograph entitled Emulsion Polymerization. The emulsifiers and catalysts which can be used are known per se.

In principle, homogeneous elastomers or those having a shell structure can be used. The shell-like structure is determined by the order of addition of the individual monomers; the morphology of the polymers is also influenced by this order of addition.

Acrylates, eg. n-butyl acrylate and 2-ethylhexyl acrylate, the corresponding methacrylates, butadiene and isoprene as well as mixtures of these may be mentioned here merely as typical monomers for the preparation of the rubber part of the elastomers. These monomers can be copolymerized with further monomers, eg. styrene, acrylonitrile, vinyl ethers and further acrylates and methacrylates, such as methyl methacrylate, methyl acrylate, ethyl acrylate and propyl acrylate.

The soft or rubber phase (having a glass transition temperature of less than 0° C.), of the elastomers may constitute the core, the outer shell or a middle shell (in the case of elastomers having a structure consisting of more than two shells); in the case of multi-shell elastomers, it is also possible for a plurality of shells to consist of one rubber phase.

If, in addition to the rubber phase, one or more hard components (having glass transition temperatures of more than 20° C.), are present in the elastomer, these hard components are generally prepared by polymerization of styrene, acrylonitrile, methacrylonitrile, α-methylstyrene p-methylstyrene, acrylates and methacrylates, such as methyl acrylate, ethyl acrylate and methyl methacrylate, as principal monomers. In addition, smaller amounts of other comonomers may also be used here.

In some cases, it has proven advantageous to use emulsion polymers which have reactive groups on the surface. Examples of such groups are epoxy, carboxyl, latent carboxyl, amino and amide groups as well as functional groups which can be introduced by the concomitant use of monomers of the general formula

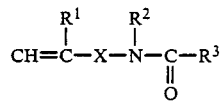

where
R¹ is hydrogen or C₁-C₄-alkyl,
R² is hydrogen, C₁-C₈-alkyl or aryl, in particular phenyl,
R³ is hydrogen, C₁-C₁₀-alkyl, C₆-C₁₂-aryl or —OR⁴,
R⁴ is C₁-C₈-alkyl or C₆-C₁₂-alkyl which can be unsubstituted or substituted by O— or N-containing groups,
X is a chemical bond, C₁-C₁₀-alkylene or C₆-C₁₂-arylene or

Y is O—Z— or NH—Z and
Z is C₁-C₁₀-alkylene or C₆-C₁₂-arylene.

Furthermore, the graft monomers described in EP-A 208 187 are suitable for the introduction of reactive groups at the surface.

Examples of monomers by means of which the stated functional groups can be introduced are glycidyl methacrylate, glycidyl acrylate, allyl glycidyl ether, vinyl glycidyl ether, glycidyl itaconate, acrylic acid, methacrylic acid and their metal salts, in particular alkali metal salts, and ammonium salts, maleic acid, fumaric acid, itaconic acid, vinylbenzoic acid, vinylphthalic acid, and monoesters of these acids with alcohols ROH, where R has not more than 29 carbon atoms and, for example, is methyl, ethyl, propyl, isopropyl, n-butyl, isobutyl, hexyl, cyclohexyl, octyl, 2-ethylhexyl, decyl, stearyl, methoxyethyl, ethoxyethyl or hydroxyethyl. Maleic anhydride and metal salts (in particular alkali metal and alkaline earth metal salts) of polymerizable carboxylic acids and esters of acrylic acid or methacrylic acid with tertiary alcohols, eg. tert-butyl acrylate, do not contain any free carboxyl groups but show similar behavior to the free acids and are therefore regarded as monomers having latent carboxyl groups.

Other examples are acrylamide, methacrylamide and substituted esters of acrylic acid or methacrylic acid, such as N-tert-butylaminoethyl methacrylate, N,N-dimethylaminoethyl acrylate, N,N-dimethylaminomethyl acrylate and N,N-diethylaminoethyl acrylate.

The particles of the rubber phase may furthermore be crosslinked. Examples of monomers which act as crosslinking agents are buta-1,3-diene, divinylbenzene, diallyl phthalate and dihydrodicyclopentadienyl acrylate, as well as the compounds described in EP-A 50 265.

It is also possible to use graft-linking monomers, ie. monomers which possess two or more polymerizable double bonds which react at different rates during the polymerization. Preferably used compounds are those in which one or more reactive groups polymerize at about the same rate as the other monomers while the other reactive group (or reactive groups) polymerizes (or polymerize), for example, substantially more slowly. The different polymerization rates result in a certain proportion of unsaturated double bonds in the rubber. If a further phase is then grafted onto such a rubber, some or all of the double bonds present in the rubber react with the graft monomers with the formation of chemical bonds, ie. some or all of the grafted phase is bonded to the grafting base via chemical bonds.

Examples of such graft-linking monomers are allyl-containing monomers, in particular allyl esters of ethylenically unsaturated carboxylic acids, such as allyl acrylate, allyl methacrylate, diallyl maleate, diallyl fumarate, diallyl itaconate and the corresponding monoallyl compounds of these dicarboxylic acids. In addition, there is a large number of other suitable graft-linking monomers; for further details, reference may be made to, for example, U.S. Pat. No. 4,148,846.

In general, the amount of these crosslinking monomers in the component (A) is not more than 5, preferably not more than 3, % by weight, based on (A).

A few preferred emulsion polymers are listed below. First, graft polymers which have a core and one or more outer shells and the following structure may be mentioned here:

| Type | Monomers for the core | Monomers for the shell |
|------|----------------------|------------------------|
| A | Buta-1,3-diene, isoprene, n-butyl acrylate, ethylhexyl acrylate or a mixture of these | Styrene, acrylonitrile, methyl methacrylate |
| B | As for A but with the concomitant use of crosslinking agents | As for A |
| C | As for A or B | n-Butyl acrylate, ethyl acrylate, methyl acrylate, buta-1,3-diene, isoprene, ethylhexyl acrylate |
| D | As for A or B | As for A or C but with the concomitant use of monomers having reactive groups as described herein |
| E | Styrene, acrylonitrile, methyl methacrylate or a mixture of these | First shell of monomers as described under A and B for the core Second shell as described under A or C for the shell |

Instead of graft polymers having a multi-shell structure, it is also possible to use homogeneous, ie. single-shell, elastomers, of buta-1,3-diene, isoprene and n-butyl acrylate or copolymers of these. These products too can be prepared with the concomitant use of cross-linking monomers or monomers having reactive groups.

Examples of preferred emulsion polymers are n-butyl acrylate/(meth)acrylic acid copolymers, n-butyl acrylate/glycidyl acrylate or n-butyl acrylate/glycidyl methacrylate copolymers, graft polymers having an inner core of n-butyl acrylate or based on butadiene and an outer shell of the abovementioned copolymers and copolymers of ethylene with comonomers which provide reactive groups.

The amount of red phosphorus ($b_2$) in the aqueous elastomer composition is from 10 to 70, preferably from 20 to 70, in particular from 25 to 65, % by weight, based on the total weight of the aqueous elastomer composition.

The red phosphorus can be used directly in the commercial form. However, there are also commercial products in which the red phosphorus is coated on the surface with low molecular weight liquid substances, such as silicone oil, liquid paraffin or esters of phthalic acid or of adipic acid or polymers or oligomers. All these products can be used according to the invention.

The median particle size $d_{50}$ (number average) of the phosphorus particles distributed in the elastomer composition is preferably from 0.0001 to 0.5, in particular from 0.001 to 0.2, mm.

The elastomer compositions contain, as component $b_3$, from 10 to 80, preferably from 12 to 70, and particularly preferably from 15 to 55, % by weight of water. Some or all of this originates from the preparation of the elastomers $b_1$ by emulsion polymerization.

The substances present as dispersants in the aqueous elastomer compositions B are known per se and are described in the literature. Alkali metal and ammonium salts of alkyl-, aryl-, alkaryl- and aralkylsulfonates, sulfates, polyethersulfates, fatty acids and hydroxy-substituted fatty acids or their esters, alcohols, amines and amides, alkylphenols and organophosphoric acids and their alkyl metal or ammonium salts, as listed in, for example, EP-A 82 020, may be mentioned here.

The aqueous elastomer compositions can simply be prepared by mixing the red phosphorus into the dispersion obtained in the emulsion polymerization in a mixing apparatus, for example a stirred kettle or another apparatus known for this purpose. This is carried out, as a rule, from 10° to 70° C., preferably at room temperature, in the course of from 1 minutes to 5 hours, preferably not less than about 10 minutes. The dispersants (emulsifiers) are, as a rule, added before the emulsion polymerization, but may also be partially added before the addition of the red phosphorus.

If the elastomer dispersion obtained in the emulsion polymerization has an excessively high or excessively low water content, the latter can be accordingly brought to the desired value by removing or adding water.

The aqueous elastomer compositions prepared in this manner, in the form of suspensions or dispersions, are free-flowing and pumpable. The major part of the phosphorus particles does not separate out, as is observed, for example, when phosphorus is mixed into water.

In addition to the components (A) and (B), the novel thermoplastic molding materials can also contain up to 60, preferably from 5 to 50, in particular from 10 to 40, % by weight of fibrous or particulate fillers or a mixture of these. Fibrous fillers, such as glass fibers, carbon fibers of fibrous silicates, such as wollastonite, are preferred. Glass spheres can also advantageously be used.

Where glass fibers are used, they may be treated with a size and an adhesion promoter to improve compatibility with the polyamide or the polyester. In general, the glass fibers used have a diameter of from 6 to 20 $\mu$m. These glass fibers can be incorporated both in the form of ground glass fibers and in the form of continuous strands (rovings). In the finished injection-molded article, the mean length of the glass fibers is preferably from 0.08 to 0.5 mm.

As stated above, the amount of fillers can be up to 60, preferably up to 50, in particular from 5 to 45, % by weight, based on the total weight of the molding material.

In addition to the essential components (A) to (C), the novel molding materials can contain conventional additives and processing assistants. The amount of these is in general not more than 60, preferably not more than 50, % by weight, based on the total weight of the components (A) to (C).

Examples of conventional additives are stabilizers and antioxidants, heat stabilizers and UV stabilizers, lubricants and mold release agents, colorants, such as dyes and pigments, and elasticizers.

Antioxidants and heat stabilizers are, for example, halides of metals of group I of the periodic table, for example sodium halides, potassium halides and lithium halides, if necessary in combination with copper(I) halides, for example chlorides, bromides or iodides. Sterically hindered phenols, hydroquinones, substituted members of this group and mixtures of these compounds, preferably in concentrations of not more than 1% by weight, based on the weight of the mixture, can also be used.

Examples of UV stabilizers are various substituted resorcinols, salicylates, benzotriazoles and benzophenones, which are generally used in amounts of not more than 2% by weight.

Lubricants and mold release agents, which as a rule are added in amounts of not more than 2% by weight, based on the thermoplastic materials, are stearic acid, stearyl alcohol, alkyl stearates and stearamides as well as esters of pentaerythritol with long-chain fatty acids.

The additives also include stabilizers which prevent the decomposition of the red phosphorus in the presence of moisture and atmospheric oxygen in the finished product. Examples of these are zinc oxide and cadmium oxide.

In the novel process for the preparation of fireproofed thermoplastic molding materials which contain red phosphorus, an aqueous elastomer composition B of the composition stated in claim 1 is mixed into a melt of the polyester or polyamide or a mixture of these (component (A), the amount of the red phosphorus being from 3 to 20% by weight, based on the total weight of the molding material, and the relative amounts of component (A) and of component (B) each being from 10 to 90% by weight.

Of course, the phosphorus content of from 3 to 20% by weight is influenced by appropriately selecting the amounts of components (A) and (B) and by the composition of the elastomer composition (B) itself, and can also be established in this manner.

The amount of red phosphorus is preferably from 4 to 16% by weight, based on the total weight of the thermoplastic molding materials.

It is possible to prepare a masterbatch of the elastomer composition in a small amount of a polyamide, to mix the elastomer composition into the melt of the polyamide or of the polyester or of a mixture of these, and to mix this mixture thoroughly and extrude it in an extruder and then, in a second operation, again to mix the product obtained in the first extrusion with further thermoplastic, i.e. polyester or polyamide, in an extruder.

The water present in the aqueous elastomer composition is preferably removed during the extrusion in the extruder, by appropriate means, which are known per se.

Any fillers C present are preferably added during the final mixing of the components in the extruder; however, it is in principle also possible to add some or all of the fillers during the preparation of the above-described masterbatch or polyamide or polyester and elastomer composition.

However, it should be emphasized that the preparation of such a masterbatch is not absolutely essential; in many cases, it has even proven advantageous to mix all components directly in one operation in an extruder or an appropriate mixing apparatus, since this reduces the thermal load on the thermoplastic (since only a single melting process is required).

Suitable mixing apparatuses are screw extruders, Brabender mills or Banbury mills, in which the components are usually mixed at from 220° to 300° C. The mixing temperatures do of course depend on the type of thermoplastic used, i.e. on the type of polyester or type of polyamide.

Novel molding materials can be converted, for example by injection molding, to moldings which have very low rubber contents and possess good mechanical properties, in particular good impact strength. The preparation as such is safer and much less of a health hazard than the incorporation of red phosphorus by mixing in a conventional manner.

The molding materials according to the invention are suitable for the production of moldings, for example for the electrical sector, the building sector and the automotive sector. It is also possible to produce films, fibers and sheets from the novel molding materials.

EXAMPLES

Preparation of the aqueous elastomer composition

A dispersion of a core/shell polymer which had a core of n-butyl acrylate and dihydrodicyclopentadienyl acrylate (weight ratio 98:2) and a shell of n-butyl acrylate and methacrylic acid (weight ratio 98:1.5) and a core/shell weight ratio of 60:40 and which had been obtained by emulsion polymerization in a conventinal manner was mixed with red phosphorus and the sodium salt of a $C_{12}-C_{18}$-alkanesulfonic acid in a stirred kettle at room temperature. The mixing time was 30 minutes.

Composition of the elastomer dispersion:
52.3% by weight of elastomer
47.2% by weight of water
0.5% by weight of the sodium salt of a $C_{12}-C_{18}$-alkanesulfonic acid.

0.9 g of the abovement emulsifier and 51.9 g of red phosphorus were added to 47.2 g of this dispersion.

A stable, free-flowing and pumpable dispersin of the following composition was obtained:

| | |
|---|---|
| 24.7% by weight of elastomer | (b₁) |
| 51.9% by weight of red phosphorus | (b₂) |
| 22.2% by weight of water | (b₃) |
| 1.2% by weight of emulsifier | (b₄) |

Preparation of the novel molding materials (Examples 1 to 3)

The following components were used:
Component A:
Polyhexamethyleneadipamide (nylon 6,6) having a relative viscosity of 2.6, measured in 96% strength sulfuric acid (1 g/100 ml) at 25° C. (Ultramid ®A3 from BASF AG).
Component B:
Elastomer composition as described above.
Component C:
Glass fibers.

64.5 kg of the polyamide (A) were melted in an extruder at 280° C., and 13.6 kg of the elastomer dispersion (B) and 25 kg of glass fibers were mixed into this melt (Example 1). In the Examples 2 and 3, the amount of polyamide was reduced to 63.8 kg and in addition 0.7 kg of cadmium oxide or zinc oxide was added as the phosphorus stabilizer.

In Comparative Examples 4 and 5, the red phosphorus was incorporated in powder form into the molding materials, a rubber whose composition corresponded to that of elastomer $b_1$ of the elastomer composition additionally being added in Example 5.

After mixing in the extruder, the molding materials were estruded, granulated, and processed to test specimens by injection molding.

The water liberated in the novel molding materials during mixing was removed via an apparatus on the extruder.

The results of the impact strength measurements according to DIN 53,453, of the damaging energy according to DIN 53,443, of the modulus of elasticity according to DIN 53,457 and of the tensile strength according to DIN 53,455, as well as the results of the flame test according to UL 94, are reproduced in Table 1.

The determination of soluble phosphorus was carried out after storage of standard small bars for 30 days in water at 80° C.

TABLE 1

| Example No. | 1 | 2 | 3 | 4V* | 5V* |
|---|---|---|---|---|---|
| Component | | | | | |
| A (% by weight) | 64.5 | 63.8 | 63.8 | 68.0 | 53.3 |
| $b_1$ (% by weight) | 3.36 | 3.36 | 3.36 | — | 14.0 |
| $b_2$ (% by weight) | 7.0 | 7.0 | 7.0 | 7.0 | 7.0 |
| $b_4$ (% by weight) | 0.14 | 0.14 | 0.14 | — | — |
| C (% by weight) | 25.0 | 25.0 | 25.0 | 25.0 | 25.0 |
| Further additives (% by weight) | — | 0.7 CdO | 0.7 ZnO | — | 0.7 CdO |
| Impact strength $a_n$ kJ/m² at 23° C. | 53 | 50 | 55 | 35 | 50 |
| Damaging energy $W_{50}$ Nm (23° C.) | 10 | 11 | 11 | — | 11 |
| Modulus of elasticity N/mm² | 7200 | 7000 | 7100 | 9000 | 5800 |
| Tensile strength N/mm² | 116 | 110 | 116 | 160 | 93 |
| Rating according to UL 94 (3 mm flat bars) | V-0 | V-0 | V-0 | V-0 | V-0 |
| ppm of P after 30 d | 190 | 60 | 80 | 105 | 40 |

*Comparative Examples

The results in Table 1 show that the novel molding materials, with substantially lower rubber contents than in Comparative Example 5, possess good impact strength and, because of the lower rubber content, the modulus of elasticity and the tensile strength are substantially better than in the case of conventional toughened polyamides having a higher rubber content.

We claim:

1. A fireproofed thermoplastic molding material, which contains red phosphorus as a flameproofing agent and which is obtainable by mixing:
   (a) from 5–95% by weight of a polyamide or a polyester or a combination thereof,
   (b) from 5–95% by weight of an elastomer dispersion containing, an essential components:
      (i) from 5–75% by weight of an elastomer prepared by emulsion polymerization,
      (ii) from 10–70% by weight of red phosphorus,
      (iii) from 10–80% by weight of water, and
      (iv) from 0.1–5% by weight of a dispersing agent capable of dispersing said elastomer, and
   (c) from 0–60% by weight of fibrous or particulate fillers or a mixture thereof, wherein the total content of red phosphorus in the molding material is from 3–20% by weight, based on the total weight of the molding material, said elastomer composition being introduced into a melt of the polyamide or of the polyester or a combination thereof.

2. The fireproofed thermoplastic molding material of claim 1, wherein said polyamide comprises lactams having from 7–13 atoms in the ring.

3. The fireproofed thermoplastic molding material of claim 2, wherein said polyamide is selected from the group consisting of polycaprolactam, polycapryllactam and polylaurolactam.

4. The fireproofed thermoplastic molding material of claim 1, wherein said polyester comprises a polyester of terephthalic acid and a $C_2$-$C_6$ diol.

5. The fireproofed thermoplastic molding material of claim 1, wherein said polyamide or polyester or combination thereof is used in the amount of 10–90% by weight, based on the total weight of the molding material.

6. The fireproofed thermoplastic molding material of claim 1, wherein said elastomer is a homogeneous elastomer or a shell-structured elastomer comprising a core rubber phase and an outer shell.

7. The fireproofed thermoplastic molding material of claim 1, wherein said red phophorus is used in the amount of 20–70% by weight, based on the total amount of the aqueous elastomer composition.

8. The fireproofed thermoplastic molding material of claim 1, wherein said red phosphorus has a number average particle size of from 0.0001–0.5 mm.

9. The fireproofed thermoplastic molding material of claim 1, which comprises from 12–70% by weight of water.

10. The fireproofed thermoplastic molding material of claim 1, wherein said dispersing agent is selected from the group consisting of alkali metal and ammonium salts of alkyl-, aryl-, alkaryl- and aralkyl sulfonates, sulfates, polyether sulfates, fatty acid and hydroxy-substituted fatty acids or esters thereof, alcohols, amines and amides, alkylphenols and organophosphoric acids and alkali metal or ammonium salts thereof.

11. The fireproofed thermoplastic molding material of claim 1, which comprises from 15 to 55% by weight of water.

12. The fireproofed thermoplastic molding material of claim 1, wherein said fibrous fillers comprise glass fibers, carbon fibers or fibrous silicates.

13. A process for the preparation of a fireproofed thermoplastic molding material, which contains red phosphorus as a flameproofing agent, which comprises mixing into a melt of a polyamide or of a polyester or of a combination thereof, an aqueous elastomer composition which contains, as essential components:
   (i) from 5–75% by weight of an elastomer prepared by emulsion polymerization,
   (ii) from 10–70% by weight of red phosphorus,
   (iii) from 10–80% by weight of water, and
   (iv) from 0.1–5% by weight of a dispersing agent capable of dispersing said elastomer, and wherein the amount of polyamide or polyester or combination thereof and said elastomer composition is each from 5–95% by weight, based on the total weight of the molding material, and the amount of said red phosphorus is from 3–20% by weight, based on the total weight of the molding material.

14. A molding comprising the thermoplastic molding material as claimed in claim 1 as an essential component.

* * * * *